W. W. BURSON.
Straw Cutter.
No. 63,852. Patented April 16, 1867.
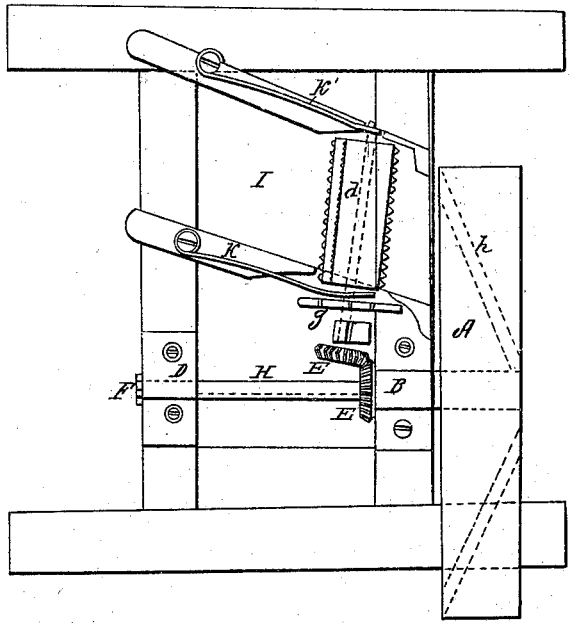
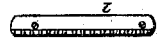
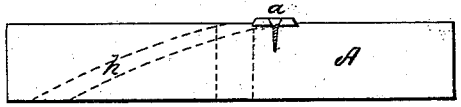
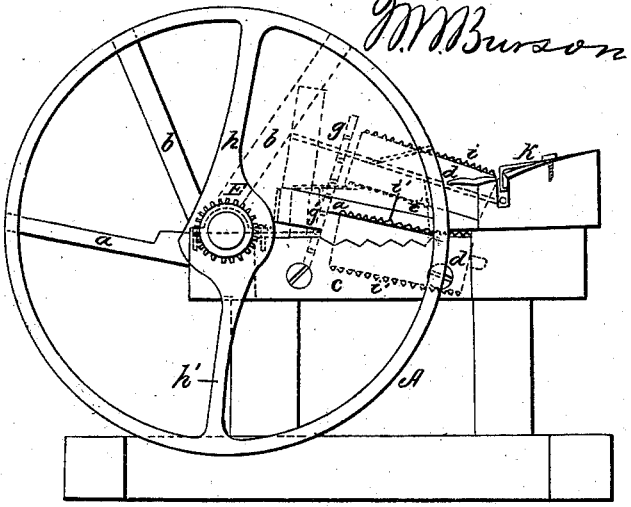
Inventor:
W. W. Burson
Witnesses:
J. S. Hyatt
John Nilson

United States Patent Office.

W. W. BURSON, OF ROCKFORD, ILLINOIS.

Letters Patent No. 63,852, dated April 16, 1867.

IMPROVEMENT IN STRAW-CUTTER.

*The Schedule referred to in these Letters Patent and making part of the same.*

TO ALL WHOM IT MAY CONCERN:

Be it known that I, W. W. BURSON, of the city of Rockford, in the county of Winnebago, and State of Illinois, have invented a new and improved Fuel and Feed-Cutter combined; and I do hereby declare that the following is a full, clear, and exact description of the same, reference being had to the annexed drawing, and to the letters of reference marked thereon. In the drawing—

Figure 1 is a front elevation of the machine.

Figure 2 is a plan view.

Figure 3 is an end view of the feed roller $d$ and its attachments.

Figure 4 is a view of feed plate $i$.

Figure 5 shows the manner of attaching the knives $a$ to pulley A.

My invention has reference to the cutting of brushwood, pruning of orchards, vineyards, hedges, &c., into convenient lengths for fuel, and by a slight change of the mechanism to use the machine for cutting hay, straw, and corn-stalks into "cut feed," and consists of certain combinations of devices hereinafter to be set forth.

In the drawing, the pulley or wheel A upon the end of shaft H, is supported on its bearings B and D. The cog-wheel E, on the said shaft H, meshes into cog-wheel E', upon the shaft of feed roller $d'$, which is thereby turned with the rotation of shaft H. Spur-wheel $g'$, meshing in spur-wheel $g$, of feed roller $d$ and $d'$ respectively, cause the feed rollers to turn uniformly, and keep in their desired relative positions with reference to their serrated and smooth sides. The upper roller $d$ is allowed to yield by the springs $k$ $k'$, when necessary. Especial attention is asked to the following points:

First. The wheel or pulley A has the knives $a$ $a'$ secured on its inner side, and opposite to the arms $h$ $h'$ of said wheel, permitting the cut material to pass through the openings of said wheel, and allowing the outer surface of this wheel to be used as a band-pulley to receive the power.

Second. The knives $a$ $a'$ $b$ $b'$ are dove-tailed into the edge of the pulley A, also in the hub of said pulley, and then fastened with a set-screw or bolt, which manner of fastening the knives is deemed important as great strength of fastening is required in this class of machinery.

Third. The arms $h$ $h'$ of the pulley A are spiral or screw-shaped, which form permits the feed to operate immediately following the passing of the knives $a$ $a'$ across the feed passage I, and at the same time gives a strong support to the rim of the pulley A.

Fourth. The inner end of the knives $a$ $a'$ are placed somewhat back of the radius line, which arrangement leaves the feed passage I open until the outer ends of said knives pass across it, which moving more rapidly than the inner end gives a "running stroke," which has been found very desirable in cutting brushwood for fuel. The stationary cutter $c$ is notched or serrated, which prevents the slipping on the lower knife of the material to be cut, which would very much weaken the force of the blow of knife $a$.

Fifth. The feed passage I is arranged to bring the material to be cut obliquely to the cutters, which arrangement has been found a great advantage in the ease of operation.

Sixth. The feed rollers $d$ $d'$ have upon their hexagonal sides the serrated plates $i$ $i$ $i$, a portion of the circumference of each roller being left smooth, and these serrated plates are so arranged that they shall not come in contact with the brush while the knife $a$ is passing the feed passage I, at which time it could not of course be moved forward.

Seventh. When used as a feed cutter, additional knives $b$ $b'$ must be fastened to pulley A, and additional plates $i$ $i$ upon the feed rollers $d$ $d'$, to give the length of cut desired. The nut F upon shaft H can be turned to bring the revolving cutters as closely to the stationary cutter $c$ as desired, a very convenient mode of compensating for the wear of the parts.

What I claim as my invention, and desire to secure by Letters Patent, is—

1. The arrangement of the cutting knives $a$ $a'$, in combination with the spiral arms $h$ $h'$ of pulley A, constructed and operating substantially as described.

2. In a combined fuel and feed-cutter, the manner of fastening the cutting knives $a$ $a'$ $b$ $b'$ to the pulley A, substantially as described.

3. The arrangement of the knives $a\ a\ b\ b'$ upon pulley A, and the construction of the stationary cutter $c$, operating substantially as and for the purpose set forth.

4. The arrangement of the feed passage I, with relation to the cutters $a c$, substantially as described and operating for the purpose set forth.

5. The construction of the feed rollers $d\ d'$, for the purpose of giving an intermittent feed motion as described.

6. The placing of the additional knives $b\ b'$ upon the pulley A, and additional serrated plates $i\ i$ upon the feed rollers $d\ d'$, substantially as described and operating for the purpose set forth.

7. The combination and arrangement of the nut F with shaft H, and cutter pulley A, substantially as described and operating for the purpose set forth.

W. W. BURSON.

Witnesses:
J. S. HYATT,
JOHN NELSON.